US007415138B2

(12) United States Patent
Schneider et al.

(10) Patent No.: US 7,415,138 B2
(45) Date of Patent: Aug. 19, 2008

(54) BIOMETRIC AUTHORIZATION METHOD AND SYSTEM (75) Inventors: John K. Schneider, Snyder, NY (US); Jack C. Kitchens, Tonawanda, NY (US); Michael Amalfi, Pittsford, NY (US); Leonard Pratt, Lockport, NY (US); Bryan Schutjer, Mansfield, OH (US)

(73) Assignee: Ultra-Scan Corporation, Amherst, NY (US)

( * ) Notice: Subject to any disclaimer, the term of this patent is extended or adjusted under 35 U.S.C. 154(b) by 145 days.

(21) Appl. No.: 10/996,690

(22) Filed: Nov. 24, 2004

(65) Prior Publication Data
US 2005/0160052 A1 Jul. 21, 2005

Related U.S. Application Data (60) Provisional application No. 60/524,967, filed on Nov. 25, 2003.

(51) Int. Cl.
G06K 9/00 (2006.01)
G05B 19/00 (2006.01)
H04Q 9/00 (2006.01)

(52) U.S. Cl. ........................... 382/115; 902/3; 340/5.51; 340/5.8

(58) Field of Classification Search ......... 382/115–127; 902/3–5; 713/182–186; 340/5.8–5.85, 5.51–5.54
See application file for complete search history.

(56) References Cited

U.S. PATENT DOCUMENTS

| 5,229,764 | A | | 7/1993 | Matchett et al. |
| 5,386,104 | A | * | 1/1995 | Sime ........................ 340/5.52 |
| 5,546,471 | A | | 8/1996 | Merjanian |
| 5,613,012 | A | * | 3/1997 | Hoffman et al. ............. 382/115 |
| 5,615,277 | A | * | 3/1997 | Hoffman ..................... 382/115 |
| 5,764,789 | A | * | 6/1998 | Pare et al. ................... 382/115 |
| 5,805,719 | A | * | 9/1998 | Pare et al. ................... 382/115 |
| 5,832,464 | A | | 11/1998 | Houvener et al. |

(Continued)

OTHER PUBLICATIONS

"How to use an ATM", http://web.archive.org/web/20001031144203/http://www.culturebridge.com/articles/how_to_use_atm.html.*

*Primary Examiner*—Bhavesh Mehta
*Assistant Examiner*—Manav Seth
(74) *Attorney, Agent, or Firm*—Hodgson Russ LLP (57) ABSTRACT A method and a system of authorizing a transaction without using a man-made token is disclosed. In a method according to the invention, a biometric sample is registered, biometric information is provided, the biometric information is compared to the biometric sample, a determination is made as to whether the biometric information matches the biometric sample, and if a match is determined, then the transaction is authorized. A system according to the invention may have a biometric database having biometric samples stored therein, a biometric identification apparatus having a biometric information gatherer, and a biometric data processor having a microprocessor and software for instructing the microprocessor to (a) receive biometric information from the biometric identification apparatus, (b) compare the biometric information with at least some of the biometric samples, (c) determine whether the biometric information matches one of the biometric samples, (d) provide an indication as to whether the biometric information matches one of the biometric samples, and (e) if the indication is that the biometric information matches one of the biometric samples, then providing an authorization of a transaction without the authorizer presenting any personalized man-made token.

43 Claims, 2 Drawing Sheets

U.S. PATENT DOCUMENTS

| | | | | |
|---|---|---|---|---|
| 5,838,812 A | * | 11/1998 | Pare et al. | 382/115 |
| 6,028,950 A | | 2/2000 | Merjanian | |
| 6,931,382 B2 | * | 8/2005 | Laage et al. | 705/67 |
| 6,950,810 B2 | * | 9/2005 | Lapsley et al. | 705/78 |
| 6,980,670 B1 | * | 12/2005 | Hoffman et al. | 382/115 |
| 7,280,981 B2 | * | 10/2007 | Huang et al. | 705/40 |
| 2001/0000535 A1 | * | 4/2001 | Lapsley et al. | 705/64 |
| 2002/0038286 A1 | * | 3/2002 | Koren et al. | 705/40 |
| 2002/0056043 A1 | * | 5/2002 | Glass | 713/179 |
| 2002/0104006 A1 | * | 8/2002 | Boate et al. | 713/186 |
| 2003/0065626 A1 | * | 4/2003 | Allen | 705/76 |
| 2004/0104266 A1 | * | 6/2004 | Bolle et al. | 235/382 |
| 2004/0153421 A1 | * | 8/2004 | Robinson | 705/75 |
| 2004/0250085 A1 | * | 12/2004 | Tattan et al. | 713/186 |
| 2005/0144133 A1 | | 6/2005 | Hoffman et al. | |
| 2005/0149544 A1 | * | 7/2005 | Bishop et al. | 707/101 |

* cited by examiner

BIOMETRIC AUTHORIZATION METHOD AND SYSTEM

CROSS-REFERENCE TO RELATED APPLICATION

This application claims the benefit of priority to U.S. provisional patent application Ser. No. 60/524,967, filed on Nov. 25, 2003.

FIELD OF THE INVENTION

This invention relates to biometric authenticated transactions.

BACKGROUND OF THE INVENTION

Traditionally, man-made personalized tokens are used to authorize an event or transaction being conducted via electronic means. Examples of such tokens include smart cards, magnetic swipe cards, identification cards or even a personal computer programmed with user-specific account data. These examples of tokens are "personalized" because they are programmed or encoded with data that is unique to the authorized user.

An example of a transaction that uses a personalized token is the transaction in which prescription medications are obtained. In prescribing medication to a patient, a physician may write the prescription on a prescription form and then sign the form. The physician presents the completed form (a token) to the patient who takes the form to a pharmacy. The pharmacy then provides the patient with the medication. Such a process of providing prescription medication has defects. For example, the pharmacy may have difficulty reading the physician's handwriting and may as a result issue the wrong medication, or the wrong instructions, or both. Additionally, the prescription form may be a fake or a forgery that has been created and completed to look like a legitimate authorization to dispense prescription drugs. Alternatively, the prescription form may be a legitimate form stolen from the physician and then completed by another person in an effort to cause the pharmacy to dispense prescription medication without the physician's authorization.

Man-made personalized tokens currently rely on an authorized user presenting the token. Such tokens are an attempt to identify the authorizer so that a transaction will occur. However, these tokens can be exchanged easily, either knowingly or unknowingly, between users. When such an exchange occurs, there is a danger that unauthorized events will occur.

The prior art includes biometric technologies which use a man-made token in conjunction with a biometric sample, such as a fingerprint, hand print, voice print, retinal image, facial scan or handwriting sample. In one such prior art device, a biometric sample is stored in electronic and reproducible form on the token itself, and so there is a significant risk of fraud because the token may be fraudulently altered. In another prior art device, the token must be presented in conjunction with the user presenting a biometric sample.

There is a need for an electronic authorization system that is highly fraud-resistant, practical, convenient for the user, and yet cost-effective to deploy. More specifically, there is a need for an electronic authorization system that relies solely on an authorizer's biometric for event or transaction authorization, and does not require the authorizer to possess a personalized man-made token, such as a smart card, magnetic swipe card, identification card, driver's license or personal computer. It would be preferable that such a system be affordable and flexible enough to be operatively compatible with existing systems, which have a variety of electronic transaction devices and system configurations.

SUMMARY OF THE INVENTION

The present invention includes a method of authorizing a transaction. For example, such a method may include registering a biometric sample of an authorizer, providing biometric information of the authorizer, comparing the biometric information with the biometric sample, determining whether the biometric information matches the biometric sample to provide an indication, and if the indication is that the biometric information matches the biometric sample, then providing an authorization of the transaction without the authorizer presenting any personalized man-made token.

An authorization system according to the invention may include a biometric database having biometric samples stored therein, a biometric identification apparatus having a biometric information gatherer, and a biometric data processor having a microprocessor and software for instructing the microprocessor to (a) receive biometric information from the biometric identification apparatus, (b) compare the biometric information with at least some of the biometric samples, (c) determine whether the biometric information matches one of the biometric samples, (d) provide an indication as to whether the biometric information matches one of the biometric samples, and (e) if the indication is that the biometric information matches one of the biometric samples, then providing an authorization of a transaction without the authorizer presenting any personalized man-made token.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

Figure 1:
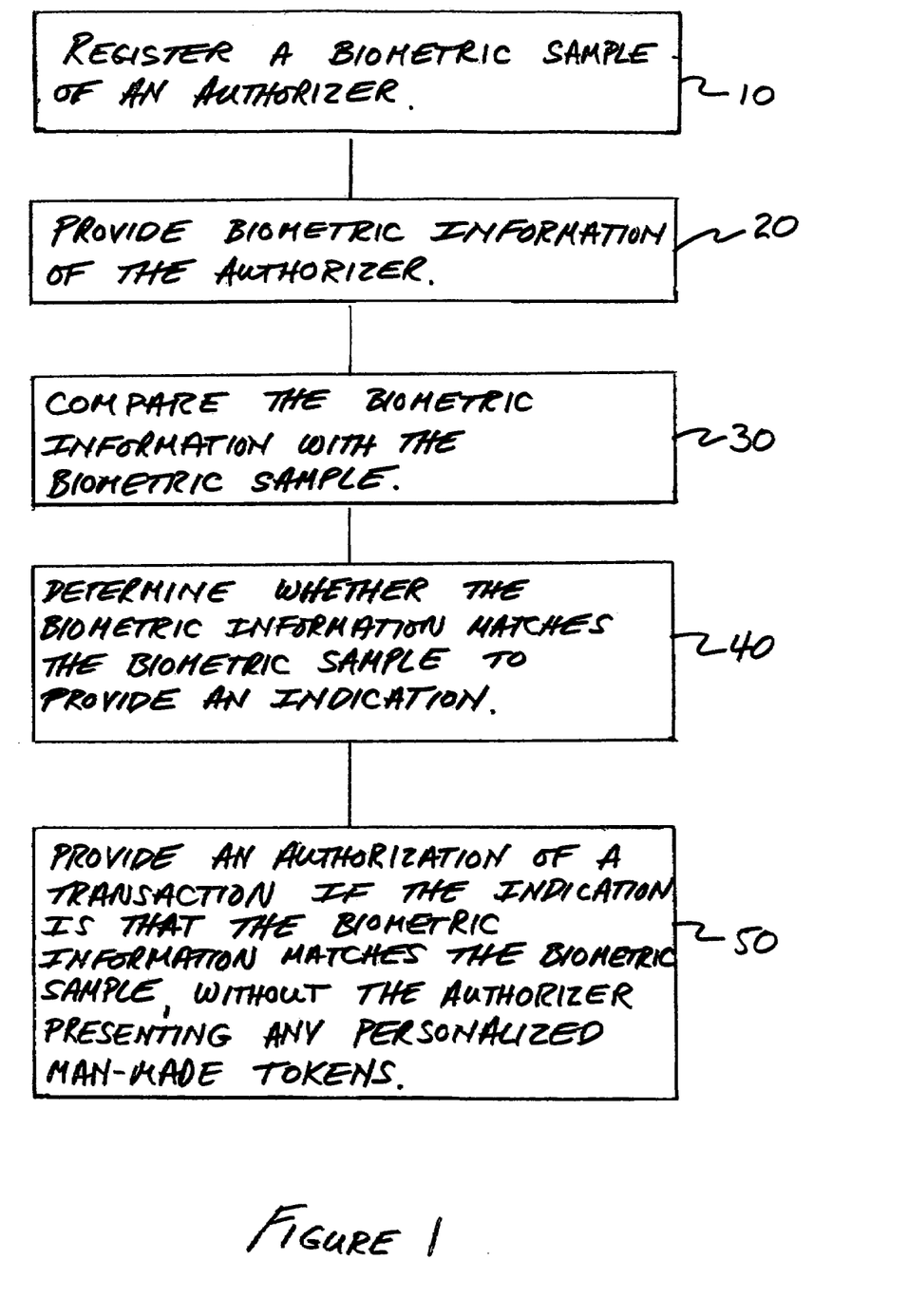
FIG. 1, which is a schematic diagram of an authorization system according to the invention, and FIG. 2, which is a schematic diagram of a method according to the invention.

The invention may be implemented as a method for authorizing a transaction, such as an electronic transaction. In such a method, the authorizer need not use a man-made personalized token in order to authorize the transaction. FIG. 1 depicts an embodiment of such a method. A biometric sample of an authorizer may be registered 10 in a database. Later, biometric information may be provided 20 by the authorizer as part of an effort to consummate a transaction. For example, the authorizer may desire to pay for goods or services, or the authorizer may desire to indicate that certain actions should be taken, for example, dispensing prescription medication. The biometric information may be compared 30 to the biometric sample, and a determination 40 may be made as to whether the biometric information matches the biometric sample. An indication as to whether the biometric information matches the biometric sample may be provided, and if the indication is that the biometric information matches the biometric sample, then the transaction may be authorized 50 without the authorizer presenting any personalized man-made token.

A record of the authorization may be made. The record may include a time when the authorization occurred, an identification of the authorizer, and an identification of the biometric sample used to provide the authorization. The record may include information identifying features of the transaction, for example, the goods purchased, the services purchased, or the actions to be taken as a result of providing the authorization.

In the event that there is a failed attempt to authorize a transaction, a record of the failed attempt may be made. For example, if the indication is that the biometric information does not match the biometric sample, then such a failed-attempt record may be made.

The invention may be implemented by registering an authorizer identification number and associating the identification number with the registered biometric sample. Then when an attempt is made to authorize a transaction, the authorizer may provide the identification number and the biometric information. Upon receiving the identification number and the biometric information, the biometric database may be searched using the identification number, and once a match is located, then the associated biometric sample may be selected and compared to the biometric information. In this manner, the biometric database may be searched more rapidly using the identification number as a searching identification number, rather than comparing each biometric sample to the biometric information.

The method of authorization may be used to authorize a single transaction, or may be used to authorize more than one transaction. Once the authorization is provided, precautions may be made to prevent the transaction from being modified.

In some instances, a party that is not related to a transaction may desire to authorize a transaction. For example, if the indication is that there is no match between the biometric information and the biometric sample of a first authorizer, then a second authorizer, unrelated to the transaction, may provide biometric information, which is then compared to biometric samples in an attempt to authorize the transaction.

In one embodiment of the invention, more than one biometric sample may be registered. If in providing a first piece of biometric information, a match can not be found, then the method may allow a second piece of biometric information to be provided in an effort to authorize the transaction using the second piece of biometric information. The ability to authorize a transaction through the use of more than one biometric sample may be important if the biometric sample becomes altered, or the body part that provided the biometric sample becomes altered or injured.

Figure 2:
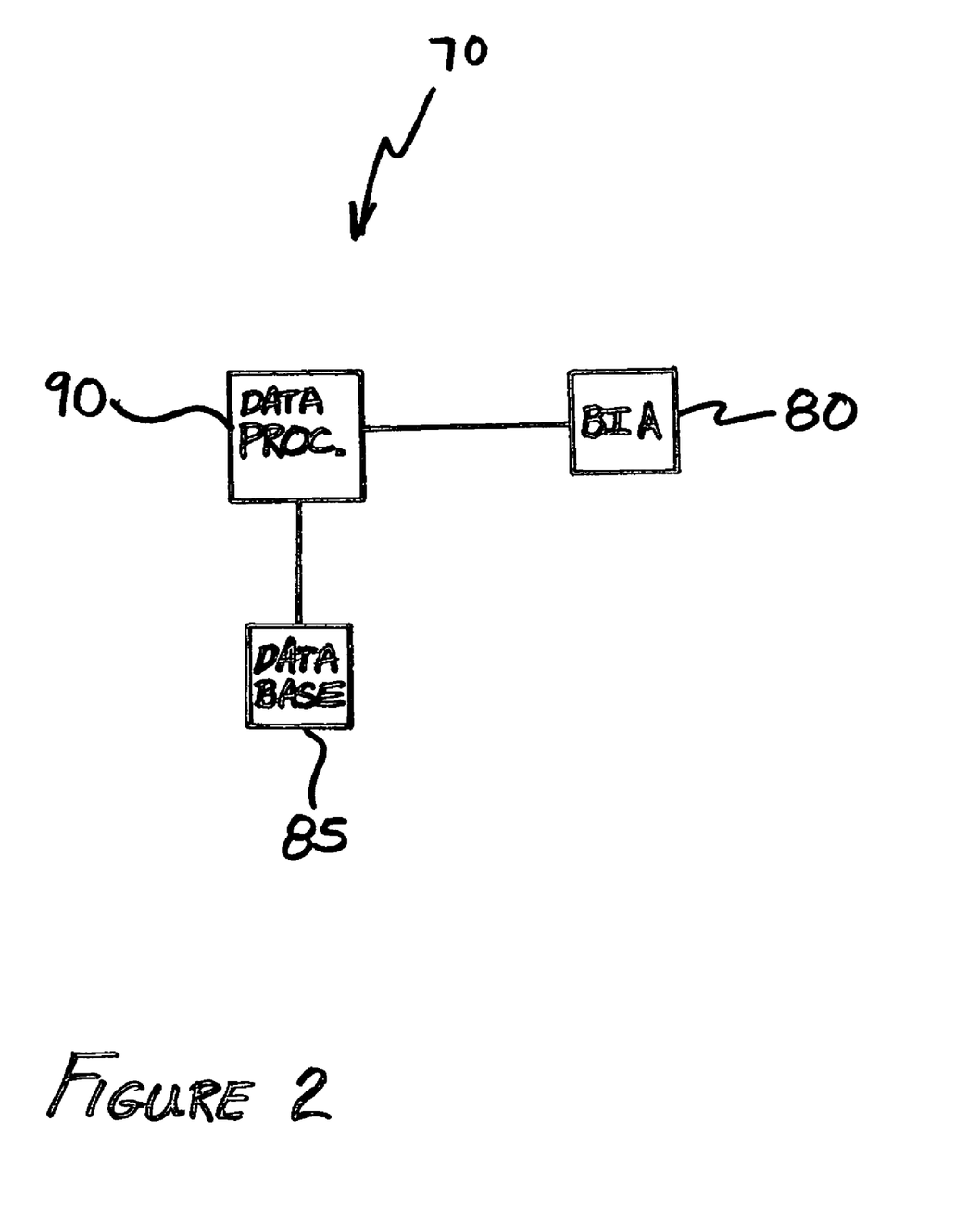

Having provided some of the features that may be included in a method according to the invention, the method is further described below, along with a description of a system according to the invention. FIG. 2 illustrates aspects of an authorization system according to the invention.

A system 70 according to the invention may be an authorization system, which may include a biometric identification apparatus ("BIA") 80 having a biometric sensor such as a fingerprint reader, iris scanner, a facial scanner, retinal scanner, an iris scanner, a hand geometry scanner, a voice print recorder, signature gait recorder, a keystroke tempo recorder, a blood vessel pattern scanner, a skin composition scanner, or other device which gathers biometric information from an individual.

The authorization system 70 may also have a biometric database 85 of biometric samples, which may be owned and/or operated by one of the parties to the transaction, or an entity that is not a party to the transaction. The authorization system 70 may also include a biometric data processor 90 having microprocessors and software for providing instructions to the microprocessors. The authorization system 70 also may have communication channels linking the BIA 80 and the biometric database 85 to the biometric data processor 90. The authorization system 70 may allow an authorizer to electronically authorize a transaction without requiring the authorizer to present a personalized man-made token, such as a driver's license or credit card.

The BIA 80 may be a device that gathers biometric information for use in authorizing an electronic transaction. The BIA 80 may have software and microprocessors capable of performing one or more of the following operations: (1) gather biometric information from an authorizer, (2) gather an authorizer's identification number, (3) encrypt a message to be sent to the biometric data processor 90, (4) provide secure storage of secret encryption keys, and/or (5) store and retrieve a unique BIA hardware identification code. The unique BIA hardware identification code may be used to prevent unauthorized equipment from being used in a system 70 according to the invention. For example, the BIA hardware identification code may be a media access control address, such as those used with cable modems. The hardware identification code may be registered with the biometric data processor 90 so that transmissions from a particular BIA 80 are uniquely identifiable as having originated from that BIA 80. The hardware identification code may be permanently stored in write-once memory of the BIA 80.

The BIA 80 may include a biometric sensor, which may be used to gather biometric information from an authorizer. The biometric sensor may be a finger print reader, iris scanner, or retinal scanner. However, it is understood that other types of biometric sensors may be used. The BIA 80 may have a biometric fraud detection system that will assure that biometric information gathered by the BIA 80 is from a living person, instead of a copy or replica. Such fraud detection systems may monitor a pulse rate, blood flow, temperature or skin color change arising from use of the BIA 80.

The BIA 80 may include a keypad, which may be used to approve or cancel a transaction. The keypad may also be used to enter an identification number. For example, an authorizer identification number may be entered via the keypad and used to provide additional security to the authorization system 70 by preventing a false acceptance of biometric information. The authorizer identification number may also be used to reduce searching time associated with determining whether biometric information matches a biometric sample in the biometric database 85. An authorizer identification number may be changed when the authorizer's biometric sample is determined to have been fraudulently duplicated. As another example, the keypad may be used to enter a non-unique identification number, which may be used to minimize searching time associated with determining whether biometric information matches a biometric sample in the biometric database 85. The non-unique identification number may be the user's name.

The BIA 80 may validate public key digital certificates. In one embodiment of the BIA 80, public keys of a particular certifying authority may be stored in the BIA 80 at the time the BIA 80 is manufactured. This provides a mechanism for verifying a digital certificate signed by an authorizer.

Communications between the BIA 80 and the biometric data processor 90 may be encrypted. Triple encryption may be effected via successive encrypt/decrypt/encrypt operations using two distinct 56-bit DES keys. Triple encryption provides higher security than a single encryption operation with one 56-bit DES key. Alternately, a public/private key system may also be used to encrypt information that passes between the BIA 80 and the biometric data processor 90. The BIA 80 may also have a secure memory that can store and retrieve the encryption keys used to enable secure communications with the biometric data processor 90.

To use encryption keys, a key management system may be employed to assure that both sender and receiver are using the same key. When using DES, a key management system that may be used is DUKPT, which is well known in the industry. DUKPT is designed to provide a different DES key for each transaction, without leaving behind the trace of the initial secret key. Such a system will not reveal previously sent messages if the BIA 80 is dissected. Details of DUKPT may be found in ANSI X9.24. The DUKPT key table may be stored in the BIA's 80 secure memory.

The BIA 80 may also employ tamper-detect circuitry, an enclosure that cannot be easily opened without visibly damaging the enclosure, erasable memory for critical secrets such as encryption keys, write-once memory for hardware identification, tight integration of components, and "potting" of exposed circuitry.

The BIA 80 may include a communication device, which may be used to provide information to the authorizer. For example, the communication device may be a screen for displaying information to the authorizer. The screen may be used to display information such as the transaction purpose, the identity of an authenticator, or other transaction-related information. The screen may be connected securely to the other components in the BIA 80 to maintain security.

The biometric data processor 90 may receive biometric information from a BIA 80, compare the biometric information to a biometric sample in the biometric database 85, and determine whether a match exists between the biometric information and a biometric sample in order to identify the authorizer of a transaction. The data processor 90 may include software having a decryption module, an identification module, a registration module and a logging module.

The decryption module may instruct a microprocessor of the biometric data processor 90 to accept encrypted messages and decrypt them. Such encrypted messages may include a BIA hardware identification code, an authorizer's identification number, or a message authentication code. Message authentication codes, also known as cryptographic checksums, may be used to assure that changes to the content of a message will be detectable by the entity receiving the transmission. The decryption module may validate a message authentication code and then check a sequence number for the BIA 80 associated with that code. If the decryption module determines that both the message authentication code and the sequence number are valid, the decryption module may use a unique secret key associated with that particular BIA 80 to decrypt the message. The decryption module may require a copy of the BIA's 80 DUKPT key table.

If a decryption operation fails, or if the message authentication code check fails, the message may be considered an invalid message. The biometric data processor 90 may log a warning to inform a person that a decryption operation failed, terminate processing of the message, and return an error message to the originating BIA 80. Warning messages may not be encrypted, although the decryption module may include a message authentication code for message authentication.

Each message received by the biometric data processor 90 may include a response key within the encrypted section of a message. Before the biometric data processor 90 replies to a message that includes a response key, the biometric data processor 90 may encrypt the response message with that response key. The decryption module also may cause the biometric data processor 90 to generate a message authentication code for the response and append that code to the message.

An identification module ("ID module") may by employed with the biometric data processor 90 to identify a party using the BIA 80. The ID module may have submodules corresponding to each type of information that may be provided to the biometric data processor 90. Each submodule may be optimized to provide rapid identification.

In one embodiment, the ID module may detect activities attempting to register an authorizer more than once with the biometric database 85. When a biometric sample is submitted by a person attempting to register with the biometric database 85, the ID module may cause the biometric data processor 90 to determine whether that person has been registered previously by comparing the new registration biometric sample with other biometric samples previously registered. If a match occurs, the subsequent registration may be rejected by the identification module.

The ID module may identify individuals or entities from (1) biometric data and an authorizer identification number, (2) biometric data alone, (3) digital identification, such as a digital certificate, or (4) a BIA hardware identification code. The ID module may be operated with two microprocessors of the biometric data processor 90, each of which may be capable of causing the biometric data processor 90 to identify an individual from his biometric sample and authorizer identification number. Each microprocessor may have responsibility for searching a particular portion of the biometric database 85. In such a system, each microprocessor may be responsible for a subset of identifications made by the biometric data processor 90.

Entities that desire to authorize a transaction may be required to register identification information with the biometric database 85. A registration module may be provided in the biometric data processor 90. The identification information for a human being may be a biometric sample. The identification information for a non-human entity may be a digital certificate or a BIA hardware identification code. To register, an authorizer may submit the identification information to an authenticator. Before allowing identification information to be added to the authorization system 70, the authenticator may verify the identity of the person providing the identification information by reviewing personal identification information, such as a driver's license or passport.

A logging module may record information corresponding to attempts to execute a transaction using the biometric data processor 90. The recorded information may be kept in write-once storage media of the biometric data processor 90, so that a record may be kept of each attempted transaction, and errors that have occurred.

The biometric database 85 may associate a biometric sample with an identification number. When biometric information is provided along with an identification number, the biometric data processor 90 may be able to narrow the search for a matching biometric sample using the identification number. For example, if biometric information and an authorizer identification number are received, the biometric data processor 90 may search through the biometric database 85, retrieving all registered biometric samples that correspond to that particular authorizer identification number. Once all corresponding registered biometric samples are retrieved, the biometric data processor 90 may compare the biometric information from the BIA 80 to all retrieved biometric samples. If a match is found, the processor may transmit the identity of the party back to the BIA 80. If no match is found, the biometric data processor 90 may transmit a "party not identified" message back to the BIA 80 and/or engaging the logging module.

One way to implement such a system 70 would be to allocate searches among microprocessors in the biometric data processor 90. As an example, one microprocessor may be responsible for identifying people with authorizer identification numbers 1-10, another microprocessor may be responsible for identifying authorizer identification numbers 11-20, and a third microprocessor may be responsible for identifying authorizer identification numbers 21-30. A message from a BIA 80 would be routed to the appropriate microprocessor based on the authorizer identification number in the message.

Since the biometric database 85 may have many biometric samples, other information may be provided that assists with searching the database 85. For biometric samples and biometric information corresponding to a finger, classification information for the biometric sample and the biometric information may be used. For example, the sample and information may be associated with a description of the type of fingerprint, such as "whirl" or "arch", or other information about the finger ridge structure. Other classification information may include a feature extracted biometric template, that may be useful for selecting biometric samples that are or are not likely to match. In this manner, the biometric database 85 may be more quickly searched to locate a match for a given piece of biometric information.

The biometric data processor 90 may include a biometric identification module having at least two biometric identification microprocessors ("BIM"). Each of the BIMs may be capable of identifying an entity only from a biometric sample. Each BIM may have access to the entire biometric database 85. To distribute the transactions evenly across the BIMs, BIMs may be selected randomly for use in a given authorization transaction. A randomly selected BIM may then perform a search of the biometric database 85 in order to find a biometric sample that matches the biometric information provided by a BIA 80.

The biometric data processor 90 may include a digital identification subsystem ("DIS") having multiple microprocessors, each of which may be programmed to identify an entity permitted to make additions or deletions to an authorization system 70 according to the invention. An entity that is permitted to make additions or deletions to a system 70 is referred to herein as an "authenticator". For example, the authenticator may add or delete biometric samples to the biometric database 85, or may add or delete BIAs 80.

Each authenticator may have a digital certificate, which may be used to verify an entity's ability to act as an authenticator. A digital certificate may uniquely identify an authenticator. When an authenticator is a human being, the digital certificate may be biometric information. When an authenticator is not a human being, a unique digital code may be used as its digital certificate. A public key may be used to verify that a digital certificate is valid. Such a system 70 may require that the DIS have a list of authenticators, their corresponding digital certificate, and the corresponding public keys used to validate the digital certificates. Such a list may be secure, and the information stored in the list may be kept up to date by a system administrator.

Transactions may occur at a point of use, from home or from a public terminal. Transactions occurring at a point of use are those which occur when an authorizer is identified via a BIA 80 that is controlled by someone other than the authorizer. In such a point of use transaction, the authorizer may be identified by matching biometric information to a biometric sample, and the entity which controls the BIA 80 may be identified via the BIA's hardware identification code, or some other non-biometric information.

At a BIA 80, user interface software ("UIS") may be used to provide an interface with a user. The UIS may be implemented as a software driver system with the ability to access the BIA 80 and supply an acquired biometric sample to the biometric database 85. To this end, it may be necessary to assure that the UIS is not stopped or interrupted by another process. The UIS may be used to program a microprocessor to identify an appropriate running application, identify a particular running portion of the program, and look for a specific button, keystroke or action. If all the necessary features and events are present, the UIS may cause the microprocessor to request collection of an authorizer's biometric information. Once the biometric information has been collected, the UIS may issue a statement prompting the authorizer to perform an act indicating that the biometric information should be compared to biometric samples. After the authorizer provides the requested indication, the UIS may cause the biometric information to be sent to the biometric data processor 90. The UIS may cause the BIA 80 to stand ready to receive an acknowledgement that the biometric information has been received by the biometric data processor 90, and a message indicating whether the biometric information was matched to a biometric sample.

If rejected, the UIS may allow several additional attempts to provide biometric information. If the additional attempts are rejected, the UIS may invoke an exception handler that allows authorization of a transaction via an alternate means. The alternate means of authorizing a transaction may be valuable for minimizing false rejection of an authorizer. To minimize false acceptance situations, the system may maintain a complete audit log of all authorization attempts and their outcomes.

The alternate means of allowing a transaction may allow a second party to authorize a transaction, or the alternate means may be a process by which the authorizer enters additional information along with the biometric information that may be stored for verification at a later time. Further, the alternate means may allow the authorizer to provide biometric information corresponding to a different body part. For example, during enrollment, all of the authorizer's fingers may be used to create biometric samples in the biometric database 85, but to speed database searches, only some of those biometric samples may be searched during an authorization process.

The UIS may allow completion of input fields by one person, and authorization by another person. For example, a nurse may be allowed to complete fields corresponding to a prescription but prevent the nurse from authorizing the prescription. To authorize such a prescription, the UIS may require a physician to supply biometric information. In this fashion, the physician is not required to spend time and effort inputting information related to the prescription.

The UIS may have a logon procedure requiring a user to provide biometric information. However, the UIS may require additional biometric information after the logon procedure is completed. A biometrically authorized logon procedure may not provide enough security since the user may have completed the logon process but not be present at the workstation. Because such situations occur, it may be necessary to prevent another individual from using the workstation in an unauthorized manner. Therefore, each transaction may require biometric information to be provided, and upon authorizing a transaction, the UIS may close that transaction so that the transaction can not be modified after authorization. For example, upon entering biometric information of a physician to authorize a prescription, the UIS may prevent additional prescriptions from being added to the transaction.

A system 70 according to the invention could be used to remove ambiguities and errors associated with handwriting interpretation, and/or could be used to reduce fraudulent authorization of prescription medication. To illustrate such a system 70, consider a medical patient who goes to his pharmacy and attempts to refill his prescription for a long term recurring use medication. If the prescription has expired because of statutory time limits or has already been filled the maximum number of times prescribed on the original script, the pharmacist may call the physician's office and describe the patient's need for a new prescription to the attendant nurse. The nurse may review the patient's records and complete an electronic prescription with the patient's personal information and the identifier for the requesting pharmacy. At this point, the nurse requests that the physician review and authorize the prescription. The physician reviews the patient's records, concurs with the nurse and agrees to the prescribed medication by providing biometric information, such as by placing a finger on a fingerprint reader of a BIA 80. The biometric information may then be appended to the authorization request and sent to the biometric data processor 90 for verification. If a match is made between the biometric information and a biometric sample in the biometric database 85, the authorization and prescription may be forwarded to the pharmacy. If the biometric data processor 90 fails to find a match, then a log may be made of the failed transaction and a failure message may be returned to the physician's BIA 80.

In another example, a hospital releases a patient and instructs the patient that a prescription has been sent to a central authorizing agency system. The patient may be instructed to have his pharmacist contact an authorizing agency system to obtain the prescription. When the patient notifies the pharmacy, the pharmacy may contact the authorizing agency system and receive the biometrically authorized prescription and a digital signature. The pharmacy then fills the prescription. Without the patient's knowledge, certain actions may have occurred in order to make it possible for the pharmacy to obtain the prescription and the authorization to dispense the medicine. For example, a physician at the hospital may have provided biometric information and the prescription to the biometric data processor 90, and upon finding a match between the biometric information and a biometric sample, the prescription may have been uploaded to the authorizing agency. The authorizing agency then held the prescription until the pharmacy submitted its request. Upon receiving the pharmacy's request, the pharmacy's digital certificate may have been checked and validated before the prescription was released to the pharmacy. Once released, the authorizing agency may have made a record of the transaction for later use, for example in an audit.

The invention has been described with reference to comparing one piece of biometric information to biometric samples. The authorization system 70 may be made more secure if multiple pieces of biometric information are used to authorize a transaction. The pieces of biometric information may be similar, for example two fingerprints, or may be taken from different locations of an authorizer's person, for example a finger print and eye color. When more than one piece of biometric information is used, a first one of the pieces may be used to narrow the number of biometric samples that must be compared to the second piece of biometric information. For example, the piece of biometric information pertaining to eye color may be used to identify a subset of the biometric samples in the biometric database 85, and then a comparison between the piece of biometric information pertaining to the fingerprint may be made with that subset of biometric samples.

From the foregoing, it will be appreciated that the invention may provide an authorization system 70 or method using biometric information and biometric samples to authorize a transaction that eliminates the need for an authorizer to possess and present a personalized man-made token. Further, the invention may provide a computer system that is capable of verifying an authorizer's identity, as opposed to verifying possession of personalized objects and information. Also, the invention may verify the authorizer's identity based upon one or more unique characteristics physically personal to the user.

The invention may provide a cost-effective biometric transaction system that is practical, convenient, and easy use. In addition, the invention may provide secured access to a computer system that is highly resistant to fraudulent transaction authorization attempts by unauthorized users.

U.S. provisional patent application No. 60/524,967 discloses embodiments of the invention. That provisional patent application is hereby incorporated by reference.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A method of providing authorization of a transaction, comprising:
   registering a biometric sample of an authorizer;
   identifying a transaction;
   providing biometric information of the authorizer;
   comparing the biometric information with the biometric sample;
   determining whether the biometric information matches the biometric sample to provide an indication;
   if the indication is that there is no match between the biometric information and the biometric sample, then allowing an unrelated person to the transaction to provide biometric information, and if the indication is that the biometric information of the unrelated person matches the biometric sample, then providing an authorization of the transaction without the unrelated person presenting any personalized man-made token.

2. The method of claim 1, further comprising creating a record of the authorization, the record including a time when the authorization occurred, an identification of the authorizer, and an identification of the biometric sample used to provide the authorization.

3. The method of claim 2, wherein the record further includes information identifying features of the transaction.

4. The method of claim 1, further comprising creating a record of a failed attempt at authorization, if the indication is that the biometric information does not match the biometric sample.

5. The method of claim 1, further comprising registering an authorizer identification number and associating the identification number with the biometric sample.

6. The method of claim 5, further comprising, prior to comparing the biometric information with the biometric sample;
   providing a searching identification number;
   locating a registered authorizer identification number that matches the searching identification number;
   selecting the associated biometric sample.

7. The method of claim 5, further comprising changing the authorizer identification number when a determination has been made that the authorizer's biometric sample has been fraudulently duplicated.

8. The method of claim 1, further comprising providing a message to the authorizer that the authorization has been provided.

9. The method of claim 1, wherein the biometric sample is one of the following: a fingerprint, a facial scan, a retinal image, an iris scan, a hand geometry scan, a voice print, a signature gait, a keystroke tempo, a blood vessel pattern, a palm print, a skin composition spectrum.

10. The method of claim 1, wherein once the authorization is provided, the transaction can not be modified.

11. The method of claim 1, further comprising registering another biometric sample of the authorizer, and using the another biometric sample if the indication is that there is no match between the biometric information and the biometric sample.

12. The method of claim 1, wherein registering the biometric sample includes checking a database of biometric samples to determine whether the biometric sample has already been registered.

13. An authorization system, comprising:
    a biometric database, having biometric samples stored therein;
    a biometric identification apparatus, having a biometric information gatherer;
    a biometric data processor, having a microprocessor and software for instructing the microprocessor to (a) receive biometric information from the biometric identification apparatus, (b) compare the biometric information with at least some of the biometric samples, (c) determine whether the biometric information matches one of the biometric samples, (d) provide an indication as to whether the biometric information matches one of the biometric samples, (e) if the indication is that there is no match between the biometric information and the biometric sample, allow an unrelated person to the transaction to provide biometric information, and if the indication is that the biometric information of the unrelated person matches the biometric sample, then providing an authorization of the transaction without the unrelated person presenting any personalized man-made token.

14. The authorization system of claim 13, wherein the biometric identification apparatus includes a communication device for providing information to an authorizer.

15. A method of providing authorization of a transaction, comprising:
    registering a biometric sample of an authorizer;
    identifying a transaction;
    providing biometric information of the authorizer;
    comparing the biometric information with the biometric sample;
    determining whether the biometric information matches the biometric sample to provide an indication; and
    if the indication is that there is no match between the biometric information and the biometric sample, then allowing an unrelated person to the transaction to provide biometric information, and if the indication is that the biometric information matches the biometric sample, then providing an authorization of the transaction without the unrelated person presenting any personalized man-made token;
    wherein once the authorization is provided, the transaction can not be modified.

16. The method of claim 15, further comprising creating a record of the authorization, the record including a time when the authorization occurred, an identification of the authorizer, and an identification of the biometric sample used to provide the authorization.

17. The method of claim 16, wherein the record further includes information identifying features of the transaction.

18. The method of claim 15, further comprising creating a record of a failed attempt at authorization, if the indication is that the biometric information does not match the biometric sample.

19. The method of claim 15, further comprising registering an authorizer identification number and associating the identification number with the biometric sample.

20. The method of claim 19, further comprising, prior to comparing the biometric information with the biometric sample;
    providing a searching identification number;
    locating a registered authorizer identification number that matches the searching identification number;
    selecting the associated biometric sample.

21. The method of claim 19, further comprising changing the authorizer identification number when a determination has been made that the authorizer's biometric sample has been fraudulently duplicated.

22. The method of claim 15, further comprising providing a message to the authorizer that the authorization has been provided.

23. The method of claim 15, wherein the biometric sample is one of the following: a fingerprint, a facial scan, a retinal image, an iris scan, a hand geometry scan, a voice print, a signature gait, a keystroke tempo, a blood vessel pattern, a palm print, a skin composition spectrum.

24. The method of claim 15, wherein the authorization is also used to authorize an additional transaction in order to allow a single authorization to apply to more than one transaction.

25. The method of claim 15, further comprising registering another biometric sample of the authorizer, and using the another biometric sample if the indication is that there is no match between the biometric information and the biometric sample.

26. The method of claim 15, wherein registering the biometric sample includes checking a database of biometric samples to determine whether the biometric sample has already been registered.

27. An authorization system, comprising:
    a biometric database, having biometric samples stored therein;
    a biometric identification apparatus, having a biometric information gatherer;
    a biometric data processor, having a microprocessor and software for instructing the microprocessor to (a) receive biometric information from the biometric identification apparatus, (b) compare the biometric information with at least some of the biometric samples, (c) determine whether the biometric information matches one of the biometric samples, (d) provide an indication as to whether the biometric information matches one of the biometric samples, and (e) if the indication is that the biometric information does not match one of the biometric samples, then allowing an unrelated person to the transaction to provide biometric information, and if the indication is that the biometric information of the unrelated person matches a biometric sample of the unrelated person, then providing an authorization of a transaction without the unrelated person presenting any personalized man-made token;

and wherein once the authorization is provided, the transaction can not be modified.

28. The authorization system of claim 27, wherein the biometric identification apparatus includes a communication device for providing information to an authorizer.

29. A method of providing authorization of a transaction, comprising:

registering a biometric sample of an authorizer;

identifying a first transaction and a second transaction;

providing biometric information of the authorizer;

comparing the biometric information with the biometric sample;

determining whether the biometric information matches the biometric sample to provide an indication;

if the indication is that the biometric information does not match the biometric sample, then allowing an unrelated person to the transaction to provide biometric information; and if the indication is that the biometric information of the unrelated person matches a biometric sample of the unrelated person, then providing an authorization of both transactions without the authorizer presenting any personalized man-made token, so as to allow a single authorization to apply to more than one transaction.

30. The method of claim 29, further comprising creating a record of the authorization, the record including a time when the authorization occurred, an identification of the authorizer, and an identification of the biometric sample used to provide the authorization.

31. The method of claim 30, wherein the record further includes information identifying features of the transaction.

32. The method of claim 29, further comprising creating a record of a failed attempt at authorization, if the indication is that the biometric information does not match the biometric sample.

33. The method of claim 29, further comprising registering an authorizer identification number and associating the identification number with the biometric sample.

34. The method of claim 33, further comprising, prior to comparing the biometric information with the biometric sample;

providing a searching identification number;

locating a registered authorizer identification number that matches the searching identification number;

selecting the associated biometric sample.

35. The method of claim 33, further comprising changing the authorizer identification number when a determination has been made that the authorizer's biometric sample has been fraudulently duplicated.

36. The method of claim 29, further comprising providing a message to the authorizer that the authorization has been provided.

37. The method of claim 29, wherein the biometric sample is one of the following: a fingerprint, a facial scan, a retinal image, an iris scan, a hand geometry scan, a voice print, a signature gait, a keystroke tempo, a blood vessel pattern, a palm print, a skin composition spectrum.

38. The method of claim 29, wherein the authorization is also used to authorize an additional transaction in order to allow a single authorization to apply to more than one transaction.

39. The method of claim 29, wherein once the authorization is provided, the transaction can not be modified.

40. The method of claim 29, further comprising registering another biometric sample of the authorizer, and using the another biometric sample if the indication is that there is no match between the biometric information and the biometric sample.

41. the method of claim 29, wherein registering the biometric sample includes checking a database of biometric samples to determine whether the biometric sample has already been registered.

42. An authorization system, comprising:

a biometric database, having biometric samples stored therein;

a biometric identification apparatus, having a biometric information gatherer;

a biometric data processor, having a microprocessor and software for instructing the microprocessor to (a) receive biometric information from the biometric identification apparatus, (b) compare the biometric information with at least some of the biometric samples, (c) determine whether the biometric information matches one of the biometric samples, (d) provide an indication as to whether the biometric information matches one of the biometric samples, (e) if the indication is that the biometric information does not match one of the biometric samples, then allowing an unrelated person to the transaction to provide biometric information, and (f) if the indication is that the biometric information of the unrelated person matches a biometric sample of the unrelated person, then providing an authorization of a first transaction and a second transaction without the authorizer presenting any personalized man-made token, so as to allow a single authorization to apply to more than one transaction.

43. The authorization system of claim 42, wherein the biometric identification apparatus includes a communication device for providing information to an authorizer.

* * * * *